United States Patent
Ichinose et al.

(10) Patent No.: US 7,060,982 B2
(45) Date of Patent: Jun. 13, 2006

(54) FLUORIDE SINGLE CRYSTAL FOR DETECTING RADIATION, SCINTILLATOR AND RADIATION DETECTOR USING THE SINGLE CRYSTAL, AND METHOD FOR DETECTING RADIATION

(75) Inventors: Noboru Ichinose, Yokohama (JP); Kiyoshi Shimamura, Funabashi (JP); Satoshi Nakakita, Yokohama (JP); Nobuhiro Izaki, Yokohama (JP)

(73) Assignee: Hokushin Corporation, Kanagawa (JP)

( * ) Notice: Subject to any disclaimer, the term of this patent is extended or adjusted under 35 U.S.C. 154(b) by 0 days.

(21) Appl. No.: 10/945,967

(22) Filed: Sep. 22, 2004

(65) Prior Publication Data

US 2005/0061982 A1    Mar. 24, 2005

(30) Foreign Application Priority Data

Sep. 24, 2003    (JP)    ............................. 2003-332328

(51) Int. Cl.
G01T 1/20    (2006.01)
C09K 11/08    (2006.01)
C09K 11/61    (2006.01)
C01F 17/00    (2006.01)

(52) U.S. Cl. ........................ 250/361 R; 252/301.4 H; 423/263

(58) Field of Classification Search .................. None
See application file for complete search history.

(56) References Cited

U.S. PATENT DOCUMENTS

| | | | |
|---|---|---|---|
| 4,242,221 A | 12/1980 | Cusano et al. | |
| 4,525,628 A | 6/1985 | DiBianca et al. | |
| 4,958,080 A | 9/1990 | Melcher | |
| 5,015,860 A * | 5/1991 | Moses | 250/361 R |
| 5,025,151 A | 6/1991 | Melcher | |
| 5,039,858 A * | 8/1991 | Anderson et al. | 250/363.03 |
| 2004/0149917 A1* | 8/2004 | Dorenbos et al. | 250/363.03 |

FOREIGN PATENT DOCUMENTS

| | | |
|---|---|---|
| JP | 58-138774 A | 8/1983 |
| JP | 58-204088 A | 11/1983 |
| JP | 59-27283 A | 2/1984 |
| JP | 59-45022 B2 | 11/1984 |
| JP | 63-113388 A | 5/1988 |
| JP | 7-188655 A | 7/1995 |
| JP | 9-118593 A | 5/1997 |
| JP | 2000-290097 A | 10/2000 |
| JP | 2000-351695 A | 12/2000 |
| JP | 2000-351696 A | 12/2000 |
| JP | 2000-351697 A | 12/2000 |

OTHER PUBLICATIONS

Shimamura et al. "Growth and Scintillation Characteristics of CeF3, PrF3, and NdF3 Single Crystals". Journal of Crystal Growth, 2003, pp. 1-8.*

(Continued)

*Primary Examiner*—David Porta
*Assistant Examiner*—Frederick F. Rosenberger
(74) *Attorney, Agent, or Firm*—Sughrue Mion, PLLC

(57) ABSTRACT

The invention provides a fluoride single crystal for detecting radiation having high luminescence intensity, a scintillator, a radiation detector employing the single crystal and a method for detecting radiation. The fluoride single crystal for detecting radiation contains Ce and at least one element ($R^1$) of Lu and Gd, wherein the single crystal is represented by $Ce_{1-x}R^1_xF_3$ ($0.001 \leq x \leq 0.5$).

16 Claims, 5 Drawing Sheets

OTHER PUBLICATIONS

M. Nikl, et al. "Scintillation Decay of $LiCaAlF_6$: $Ce^{3+}$ Single Crystals", Phys. Stat. Sol., vol. 187, No. 1, pp. R1-R3, 2001.

A. Getkin, et al., "$LiCaAlF_6$: Ce crystal a new scintillator", Nuclear Instruments and Methods in Physics Research A. vol. 486, pp. 274-277, 2002.

E. Auffray, et al., "Extensive studies on $CeF_3$ crystals, a good candidate for electromagnetic calorimetry at future accelerators", Nuclear Instruments and Methods in Physics Research A, vol. 383, pp. 367-390, 1996.

Kiyoshi Shimamura, et al., "Growth and scintillation characteristics of $CeF_3$, $PrF_3$ and $NdF_3$ single crystals", Journal of Crystal Growth, pp. 1-8, 2003.

Carel W. E. Van Eijk, "Inorganic-scintillator development", Nuclear Instruments and Methods in Physics Research A. vol. 460, pp. 1-14, 2001.

Abstract for Japanese Application Publication No. 59-45022 B published on Nov. 2, 1984.

Abstract for Japanese Application Publication No. 59-27283 A published on Feb. 13, 1984.

* cited by examiner

FLUORIDE SINGLE CRYSTAL FOR DETECTING RADIATION, SCINTILLATOR AND RADIATION DETECTOR USING THE SINGLE CRYSTAL, AND METHOD FOR DETECTING RADIATION

BACKGROUND OF THE INVENTION

1. Field of the Invention

The present invention relates to a novel fluoride single crystal for detecting radiation, a scintillator, a radiation detector using the single crystal and a method for detecting radiation. More particularly, the invention relates to a fluoride single crystal for detecting radiation and for use in a medical diagnosing apparatus such as an X-ray computed tomography (X-ray CT), a positron emission computed tomography (PET), or a time-of-flight positron emission computed tomography (TOF-PET) and to a radiation detector.

2. Background Art

Conventionally, radiation has been employed in a variety of fields such as medical diagnosis and non-destructive inspection carried out in industry. For example, medical diagnosis apparatuses such as an X-ray CT and a PET have been put into practical use. Such apparatuses employing radiation have a detector for detecting radiation such as a γ-ray or an X-ray, and a known detector employs a scintillator.

A scintillator is a substance which radiates, through stimulation by a γ-ray or an X-ray, visible light or an electromagnetic wave having a wavelength in the vicinity of that of visible light. Thus, the scintillator is required to have high density, a short decay period of luminescence, excellent resistance to radiation, etc.

Conventionally, a bismuth germanate ($Bi_4Ge_3O_{12}$; BGO) single crystal has been employed as a scintillator material for use in a PET. Japanese Patent Publication (kokoku) No. 62-8472 discloses that a cerium-doped gadolinium silicate ($Ce:Gd_2SiO_5$; Ce:GSO) single crystal has also been developed in order to attain excellent performance and is used in practice.

U.S. Pat. Nos. 4,958,080 and 5,025,151, Japanese Patent Application Laid-Open (kokai) No. 9-118593, and other documents disclose that a cerium-doped lutetium oxyorthosilicate ($Ce:Lu_2SiO_5$; Ce:LSO) single crystal has been developed on the basis of extensive studies in order to attain further excellent performance and is used in practice as one of the most promising scintillator materials.

As compared with a scintillator for use in a PET, a scintillator for use ,in a TOF-PET is required to possess a higher time resolution. Therefore, at present, CsF is employed in a TOF-PET, and use of $BaF_2$, generally produced as materials for optical lenses, is underway. However, CsF has a drawback of a highly deliquescent nature, and $BaF_2$ has drawbacks that the barium fluoride emits a short-lifetime luminescence employable in a TOF-PET in a UV region, thereby imposing the requirement of a UV detector, and that a delayed, strong light emitted from the fluoride destroys the detector.

In addition to the aforementioned single crystals, a variety of ceramic materials have been investigated for use as a scintillator. Specifically, Japanese Patent Publication (kokoku) No. 59-45022 discloses polycrystalline materials (ceramic materials) such as BaFCl:Eu, LaOBr:Tb, CsI:Tl, $CaWO_4$, and $CdWO_4$. Japanese Patent Application Laid-Open (kokai) No. 59-27283 discloses rare earth metal oxide polycrystalline materials (ceramic materials) having a cubic crystal structure such as $(Gd, Y)_2O_3$:Eu. Japanese Patent Application Laid-Open (kokai) No. 58-204088 discloses rare earth metal oxide sulfide polycrystalline materials (ceramic materials) such as $Gd_2O_2S$:Pr.

Since such ceramic scintillator materials are produced by sintering a powder material, a variety of approaches have been taken for improving transparency (light-permeability), sinterablity, etc. For example, Japanese Patent Application Laid-Open (kokai) No. 7-188655 discloses that the amount of impurity (particularly phosphate ($PO_4$)) contained in a ceramic phosphor such as $Gd_2O_2S$:Pr is reduced to 100 ppm or less, thereby enhancing light output of the scintillator. Japanese Patent Publication (kokoku) No. 5-16756 discloses a ceramic phosphor having an increased density that is produced by adding, as a sintering aid, a fluoride such as LiF, $Li_2GeF_6$, or $NaBF_4$ to a rare earth metal oxide sulfide powder and sintering the powder mixture under hot isostatic pressing (HIP) conditions.

As described above, a variety of substances such as oxide single crystals and ceramics have been investigated for practical use as a scintillator. However, no substances having characteristics more excellent than those of Ce:LSO have yet been found, and research in this field is now at a deadlock. Regarding a scintillator for use in a TOF-PET, no substance superior to CsF has ever been proposed.

Notably, since a fluoride single crystal has high light transmittance in a wide wavelength range, a small crystal field, and a negative temperature coefficient of refractive index, the single crystal has been a remarkably promising candidate as a material employable in a laser. However, most of the single crystals other than single-crystals of CsF and $BaF_2$ have not been studied for employment as radiation-detecting materials such as a scintillator. From another aspect, a fluoride single crystal encounters difficulties in production, such as controlling of the atmosphere for production, the temperature at production, the purity of raw materials, and the composition of raw materials. Thus, a large-scale bulk crystal of the fluoride is difficult to produce. Under such circumstances, the present inventors previously developed a technique of producing high-quality single crystals, and produced some fluoride single-crystals. Specifically, Japanese Patent No. 3062753 discloses a technique developed by the inventors for producing high-quality single crystals in a safe and simple manner. Japanese Patent No. 3089418 discloses lithium calcium aluminum fluoride serving as a laser single crystal. Japanese Patent No. 3168294 discloses a barium lithium fluoride single crystal. In addition, lithium calcium aluminum fluoride has been reported to have characteristics. suitable for use as a scintillator, in "Scintillation decay of $LiCaAlF_6$:$Ce^{3+}$ single crystals," M. Nikl, N. Solovieva, E. Mihokova, M. Dusek, A. Vedda, M. Martini, K. Shimamura, and T. Fukuda, Phys. Stat. Sol. (a) 187 (2001) R1–R3;and "$LiCaAlF_6$:Ce crystal: a new scintillator," A. Gektin, N. Shiran, S. Neicheva, V. Gavrilyuk, A. Bensalah, T. Fukuda, and K. Shimamura, Nuclear Instruments and Methods in Physics Research A 486 (2002) 274–277. However, lithium calcium aluminum fluoride has the problem that the density is as low as 2.94 g/cm$^3$ and the γ-ray absorption coefficient is small. Meanwhile, a cerium fluoride single crystal has a luminescence wavelength in a UV region. Since cerium fluoride can be produced in the form of colorless, transparent single crystals, no absorption due to scattering occurs, providing excellent characteristics in luminescence lifetime. Japanese Patent Application Laid-Open (kokai) No. 2000-290097 discloses a cerium fluoride single crystal that has been investigated as a promising candidate scintillator. However, the emission output is problematically low; i.e., half the output of BGO.

SUMMARY OF THE INVENTION

In view of the foregoing, the present inventors have carried out extensive studies on a radiation-detecting material, and have found that the emission output of cerium fluoride, when irradiated with a γ-ray, an X-ray, or like radiation, can be drastically enhanced by incorporating, to cerium fluoride, at least one element of lutetium (Lu) and gadolinium (Gd) so that the resultant fluoride has a composition represented by $Ce_{1-x}R^1{}_xF_3$ ($0.001 \leq x \leq 0.5$), and have found that the obtained fluoride is useful as a material for detecting radiation, such as a scintillator. The present invention has been accomplished on the basis of these findings. Thus, an object of the present invention is to provide a fluoride single crystal for detecting radiation which has a high luminescence intensity. Another object of the invention is to provide a scintillator composed of a fluoride single crystal. Another object of the invention is to provide a radiation detector employing the single crystal. Another object of the invention is to provide a use of the fluoride single crystal. Another object of the invention is to provide a method for detecting radiation.

Accordingly, in a first aspect of the invention, there is provided a fluoride single crystal for detecting radiation comprising Ce and at least one element ($R^1$) of Lu and Gd, wherein the single crystal is represented by $Ce_{1-x}R^1{}_xF_3$ ($0.001 \leq x \leq 0.5$).

Preferably, the fluoride single crystal for detecting radiation further contains at least one element ($R^2$) selected from among Sc, Y, and La and is represented by $(Ce_{1-x}R^1{}_x)_{1-y}R^2{}_yF_3$ ($0.001 \leq x \leq 0.5$; $y \leq 0.95$).

In a second aspect of the present invention, there is provided a scintillator composed of a fluoride single crystal comprising Ce and at least one element ($R^1$) of Lu and Gd, wherein the single crystal is represented by $Ce_{1-x}R^1{}_xF_3$ ($0.001 \leq x \leq 0.5$).

Preferably, the fluoride single crystal further contains at least one element ($R^2$) selected from among Sc, Y, and La and is represented by $(Ce_{1-x}R^1{}_x)_{1-y}R^2{}_yF_3$ ($0.001 \leq x \leq 0.5$; $y \leq 0.95$).

In a third aspect of the present invention, there is provided a radiation detector comprising a scintillator composed of a fluoride single crystal for detecting radiation, and a light detector detecting light emitted from the scintillator.

In a fourth aspect of the present invention, there is provided a use of a fluoride single crystal for detecting radiation.

In a fifth aspect of the present invention, there is provided a method for detecting radiation comprising applying radiation to a fluoride single crystal, thereby emitting luminescence, and detecting the emitted luminescence.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with accompanying drawings, in which.

DETAILED DESCRIPTION OF PREFERRED EMBODIMENTS

Figure 1:
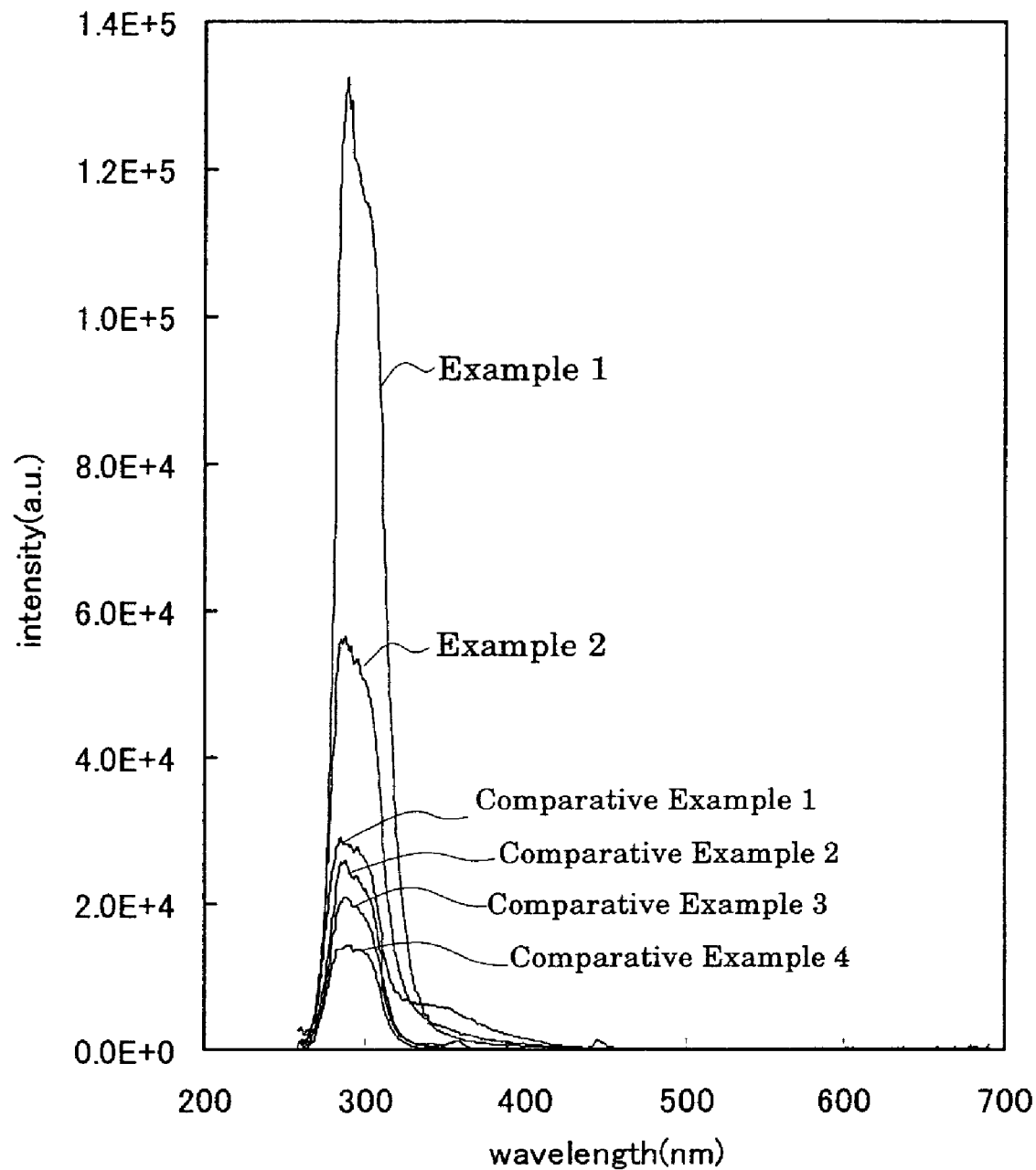
FIG. 1 is a chart showing X-ray luminescence spectra of single crystals of the Examples and the Comparative Examples.

The fluoride single crystal of the present invention for detecting radiation is formed of an $R^1$-substituted cerium fluoride (hereinafter referred to as "$R^1$:$CeF_3$") single crystal, which is based on $CeF_3$ in which a portion of Ce atoms are substituted by Lu and/or Gd, and is represented by $Ce_{1-x}R^1{}_xF_3$ ($0.001 \leq x \leq 0.5$). Since Lu or Gd itself does not emit light or emits only weak light due to its high atomic density, partial substitution of Ce atoms of $CeF_3$ conceivably produces a fluoride single crystal exhibiting high luminescence intensity for detecting radiation. When "x" is smaller than 0.001 or the "x" is greater than 0.5, the effect of enhancing luminescence intensity may be insignificant. In the latter case, cracks may also be generated in the crystal. No particular limitation is imposed on the method for producing such fluoride single crystals, so long as the aforementioned composition is ensured.

Lutetium (Lu) or gadolinium (Gd) is incorporated preferably in the form of fluoride. Needless to say, lutetium species and gadolinium species having no absorption in a luminescence wavelength region are preferably employed.

In addition to at least one element ($R^2$) of Lu and Gd, Ce atoms may be further substituted by at least one element ($R^2$) selected from among scandium (Sc), yttrium (Y), and lanthanum (La). Similar to Lu and Gd, the three elements Sc, Y, and La have an electron configuration in which the outermost d orbital accommodates one electron, and the outermost s orbital is filled with electrons. This electron configuration is suitable for generating luminescence. The Ce atoms may be substituted by $R^2$ to a degree of about 95 mol %. When containing Sc, Y, or La, the fluoride single crystal of the present invention is represented by $(Ce_{1-x}R^1{}_x)_{1-y}R^2{}_yF_3$ ($0.001 \leq x \leq 0.5$). The "y" in the formula is 0.95 or less, preferably 0.7 or less, more preferably 0.005 to 0.5. When "y" is smaller than 0.005 or the "y" is greater than 0.95, the effect of enhancing luminescence intensity is insignificant.

In order to enhance intensity of luminescence generated from a fluoride single crystal through absorption of radiation, thereby enhancing scintillator characteristics, other dopants may be further incorporated into the fluoride in accordance with needs. The dopants may be added in the form of fluoride. Examples of the dopants include neodymium (Nd), praseodymium (Pr), europium (Eu), thulium (Tm), holmium (Ho), erbium (Er), terbium (Tb), and dysprosium (Dy). Furthermore, in order to red-shift the luminescence wavelength, a dopant such as barium (Ba) may be incorporated into the fluoride. Use of the dopants is described in a document (E. Auffray et al., Nuclear Instruments and Methods in Physics Research A 383 (1996) 367 –390). Such a dopant is added in an amount of, for example, about 0.01 mol % to 1 mol %. Since such a dopant may cause variation in luminescence lifetime, the dopant must be appropriately selected in accordance with desired characteristics.

The fluoride single crystal of the present invention for detecting radiation is used as, for example, a scintillator employed in a detector of a PET or a TOF-PET. Therefore, the fluoride must be produced in the form of high-quality, uniform bulk crystal. Such a bulk crystal is preferably formed through the following production method.

Specifically, the fluoride single crystal of the present invention for detecting radiation is preferably produced through melt growth or solution growth. In the case of production of the $R^1$:$CeF_3$ of the present invention, melt growth or solution growth is preferably carried out under the following procedure. Polycrystalline fluoride sources ($CeF_3$, $R^1F_3$, etc.) in the form of powder or bulk are heated from room temperature to a temperature equal to or lower than the lowest melting point of the sources; e.g., 500 to 800° C., while a high vacuum of $10^{-4}$ to $10^{-5}$ Torr is maintained. After completion of feeding of argon and a freon gas such as $CF_4$ to a furnace (ratio by volume; freon gas:argon gas=100:0 to 0:100), the mixture is heated to a temperature equal to or higher than the highest melting point of the sources, thereby inducing reaction of an impurity generated or present in the melt or solution and on the surface of the melt or solution with the gas so as to remove the impurity. The single crystal is grown from the thus-produced melt or solution.

When the aforementioned production method is employed, high-quality single crystals can be produced in a simpler manner as compared with a conventional method, even when a fluoride source having a purity as low as 99.9 wt. % is used. The fluoride single crystal of the present invention can be produced from a melt or solution from which an impurity has been removed, in an inert gas (e.g., Ar) atmosphere, through melt growth or solution growth.

The fluoride single crystal of the present invention for detecting radiation will next be described in more detail.

The fluoride single crystal of the present invention for detecting radiation is produced through the following procedure. Specifically, a crucible is charged with polycrystalline or powdered cerium fluoride ($CeF_3$), a lutetium source (e.g., lutetium fluoride ($LuF_3$)) and/or a gadolinium source (e.g., gadolinium fluoride ($GdF_3$)), and, in accordance with needs, a dopant source and an $R^2$ element source (e.g., scandium fluoride ($ScF_3$), yttrium fluoride ($YF_3$), or lanthanum fluoride ($LaF_3$)). The mixture is heated from room temperature to about 500 to 800° C. (i.e., a predetermined temperature not higher than the lowest melting point), while a high vacuum of about $10^{-4}$ to $10^{-5}$ Torr is maintained so as to remove water and oxygen contained in a furnace or the sources. Subsequently, argon and a freon gas such as $CF_4$ are fed to the furnace (ratio by volume; freon, gas:argon gas=100:0 to 0:100), and the mixture is heated to a temperature equal to or higher than the highest melting point of the sources, thereby inducing reaction of an impurity generated or present in the melt or solution and on the surface of the melt or solution with the freon gas so as to remove the impurity. From the thus-produced melt or solution, $R^1$:$CeF_3$ is produced.

No particular limitation is imposed on the method for producing a single crystal from the thus-produced melt or solution, and the pulling method or the Bridgman method may be employed. For example, when the pulling method is employed, the temperature of the melt is maintained in the vicinity of melting points of raw materials, and a seed crystal is pulled from the melt at 0.1 to 10 mm/h with rotation at 1 to 50 rpm, thereby producing a transparent, high-quality single crystal having no defects such as bubbles and scattering centers in the crystal. The fluoride single crystal of the present invention may also be produced simply by gradually cooling the corresponding melt. If growth conditions are appropriately adjusted, the single crystal can be produced simply by gradually cooling the corresponding melt without use of a seed crystal.

The thus-produced $R^1$:$CeF_3$ emits high-intensity luminescence when excited with an X-ray or a γ-ray, and therefore, is useful as a scintillator for a PET or a TOF-PET.

A scintillator, which is obtained by cutting the $R^1$:$CeF_3$ at predetermined dimensions, is assembled with a light detector which is adapted to the wavelength of the luminescence emitted through absorption of radiation such as an X-ray or a γ-ray (e.g., a photo-multiplier for UV rays or visible light), to thereby providing a radiation detector.

EXAMPLES

Example 1

$CeF_3$ and $LuF_3$ (commercial bulk crushed materials, purity of 99.99%) were placed in a crucible at a mole ratio of 90:10. The two compounds were not well mixed. The crucible was placed in a furnace for single crystal growth, and the interior pressure was reduced to about $10^{-4}$ to $10^{-5}$ Torr. Under the reduced pressure, the raw materials were heated to about 700° C. in order to remove water and oxygen contained in the furnace or the sources. Subsequently, argon and $CF_4$ were fed to the furnace for single crystal growth (ratio by volume: $CF_4$ gas:argon gas=50:50), and the raw materials were melted in the mixture gas atmosphere. The liquid state was maintained for one hour. Impurities migrated to the surface of the liquid were completely removed through reaction with $CF_4$ gas. Subsequently, a seed crystal was brought into contact with the melt, and pulled in the c-axis direction at a pulling rate of 1 mm/h with rotation of 10 rpm, thereby growing a single crystal. The thus-produced crystal was found to be a transparent, high-quality lutetium-substituted cerium fluoride (Lu:$CeF_3$) single crystal having no defects such as bubbles, cracks, and scattering centers.

Example 2

The procedure of Example 1 was repeated, except that the mole ratio of $CeF_3$ to $LuF_3$ was changed to 95:5, to thereby grow a single crystal.

Example 3

$CeF_3$ and $LuF_3$ (commercial bulk crushed materials, purity of 99.99%) were placed in a crucible at a mole ratio of 99:1. The two compounds were well mixed. The crucible was placed in a furnace for single crystal growth, and the interior pressure was reduced to about $10^{-4}$ to $10^{-5}$ Torr. Under the reduced pressure, the raw materials were heated to about 700° C. in order to remove water and oxygen contained in the furnace or the sources. Subsequently, argon and $CF_4$ were fed to the furnace for single crystal growth, the raw materials were melted in the mixture gas atmosphere. The liquid state was maintained for three hours. Impurities migrated to the surface of the liquid were completely removed through reaction with $CF_4$ gas. Subsequently, a seed crystal was brought into contact with the melt, and pulled in the c-axis direction at a pulling rate of 1.5 mm/h with rotation of 10 rpm, thereby growing a single crystal. The thus-produced crystal was found to be a transparent, high-quality lutetium-doped cerium fluoride (Lu:$CeF_3$)

single crystal having dimensions (diameter: about 15 mm, length: about 70 mm) and no defects such as bubbles, cracks, and scattering centers.

Example 4

CeF$_3$ and GdF$_3$ (commercial bulk crushed materials, purity of 99.99%) were placed in a crucible at a mole ratio of 90:10. The two compounds were well mixed. The crucible was placed in a furnace for single crystal growth, and the interior pressure was reduced to about $10^{-4}$ to $10^{-5}$ Torr. Under the reduced pressure, the raw materials were heated to about 700° C. in order to remove water and oxygen contained in a furnace or the sources. Subsequently, argon and CF$_4$ were fed to the furnace for single crystal growth, the raw materials were melted in the mixture gas atmosphere. The liquid state was maintained for three hours. Impurities migrated to the surface of the liquid were completely removed through reaction with CF$_4$ gas. Subsequently, a seed crystal was brought into contact with the melt, and pulled in the c-axis direction at a pulling rate of 1.5 mm/h with rotation of 10 rpm, thereby growing a single crystal. The thus-produced crystal was found to be a transparent, high-quality gadolinium-doped cerium fluoride (Gd:CeF$_3$) single crystal having dimensions (diameter: about 15 mm, length: about 70 mm) and no defects such as bubbles, cracks, and scattering centers.

Example 5

The procedure of Example 4 was repeated, except that the mole ratio of CeF$_3$ to GdF$_3$ (commercial bulk crushed materials, purity of 99.99%) was changed to 95:5, to thereby grow a single crystal.

Example 6

The procedure of Example 4 was repeated, except that the mole ratio of CeF$_3$ to GdF$_3$ (commercial bulk crushed materials, purity of 99.99%) was changed to 97:3, to thereby grow a single crystal.

Example 7

The procedure of Example 4 was repeated, except that the mole ratio of CeF$_3$ to GdF$_3$ (commercial bulk crushed materials, purity of 99.99%) was changed to 99:1, to thereby grow a single crystal.

Comparative Example 1

The procedure of Example 2 was repeated, except that no LuF$_3$ was added, to thereby grow a single crystal.

Comparative Example 2

The procedure of Example 2 was repeated, except that ErF$_3$ was used instead of LuF$_3$, to thereby grow a single crystal.

Comparative Example 3

The procedure of Example 2 was repeated, except that TmF$_3$ was used instead of LuF$_3$, to thereby grow a single crystal.

Comparative Example 4

The procedure of Example 2 was repeated, except that HoF$_3$ was used instead of LuF$_3$, to thereby grow a single crystal.

Comparative Example 5

The procedure of Example 3 was repeated, except that no LuF$_3$ was added, to thereby grow a single crystal.

Test Example 1

X-ray luminescence spectra of the single crystals produced in the Examples and the Comparative Examples were measured. The results are shown in FIG. 1. As shown in FIG. 1, luminescence intensity was remarkably enhanced through substitution of a portion of Ce atoms of CeF$_3$ by Lu. As compared with the intensity of Comparative Example 1 (without substitution by Lu), the intensity was confirmed to be doubled (Example 2) and quadruped (Example 1). In contrast, single crystals of Comparative Examples 2 to 4, which contained Er, Tm, and Ho as substitution elements instead of Lu, respectively, exhibited luminescence intensity lower than the intensity of Comparative Example 1 (without substitution by Lu).

Test Example 2

The composition of the single crystal obtained in Example 3 was analyzed through X-ray fluorescence spectroscopy. Table 1 shows the results. The analysis was performed by means of a spectrometer PW 2404 (product of PHILIPS). The analysis revealed that the Lu content of the formed single crystal was lower than the value calculated from the amount of fed raw material. Thus, similar to the single crystal of Example 3, the single crystals of Example 1 and 2 are thought to have a Lu content lower than the value calculated from the amount of fed raw material.

TABLE 1

| CeF$_3$:Lu | |
|---|---|
| | Mole ratio |
| Ce | 1.000 |
| Lu | 0.003 |
| F | 2.950 |

Figure 2:
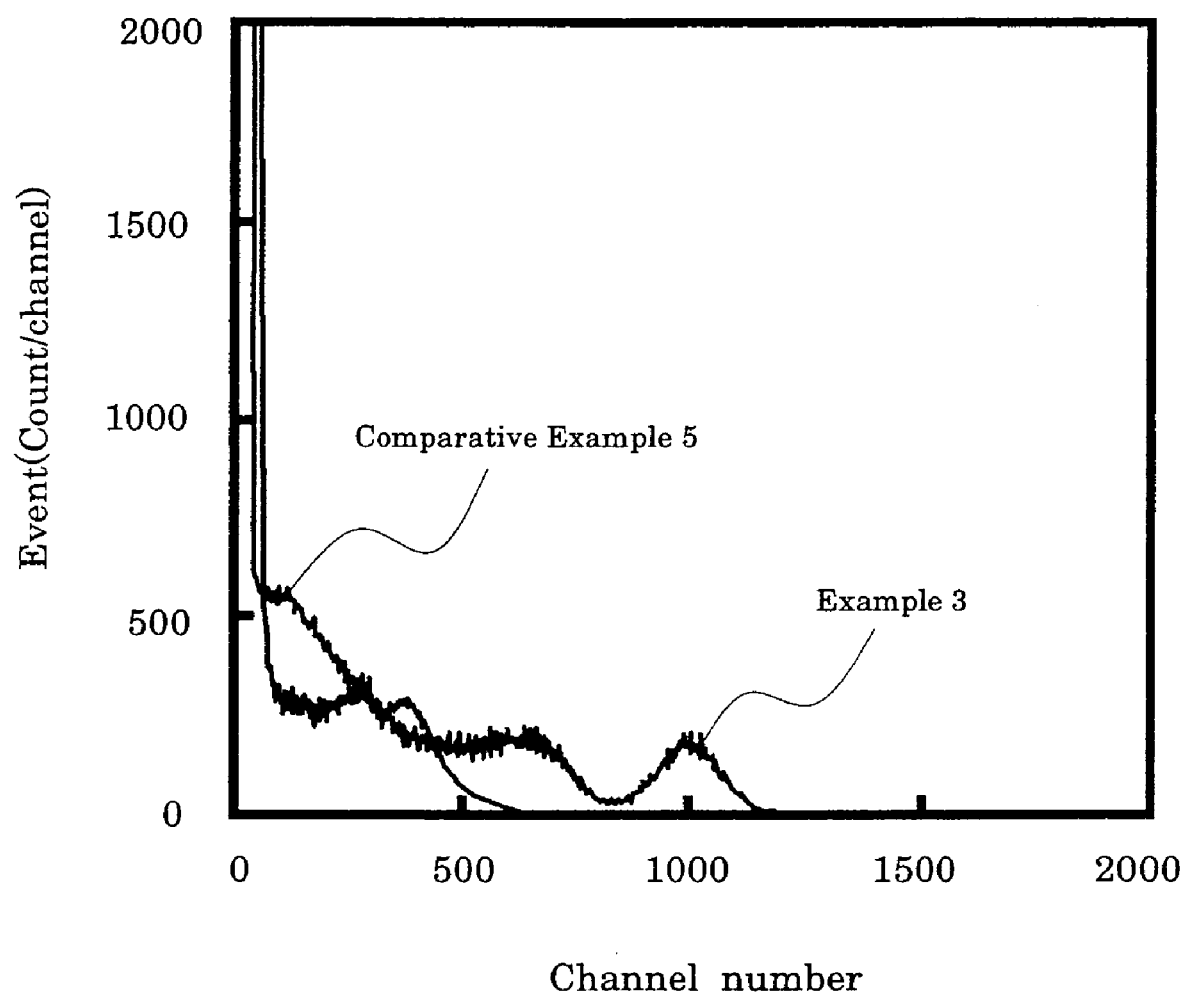
FIG. 2 is a chart showing γ-ray energy spectra of single crystals of Example 3 and Comparative Example 5.

Test Example 3

γ-Ray energy spectra of the single crystals produced in Example 3 and Comparative Example 5 were measured. The results are shown in FIG. 2. As shown in FIG. 2, the single crystal of Example 3 exhibited a full-energy peak 2.7 times that of a full-energy peak of the single crystal of Comparative Example 5. The results indicate that the light output of luminescence induced by γ-ray of the single crystal of Example 3 was remarkably enhanced as compared with Comparative Example 5.

Test Example 4

Decay time of luminescence induced by γ-ray of the single crystals produced in Example 3 and Comparative Example 5 was determined. The results are shown in FIGS.

Figure 3:
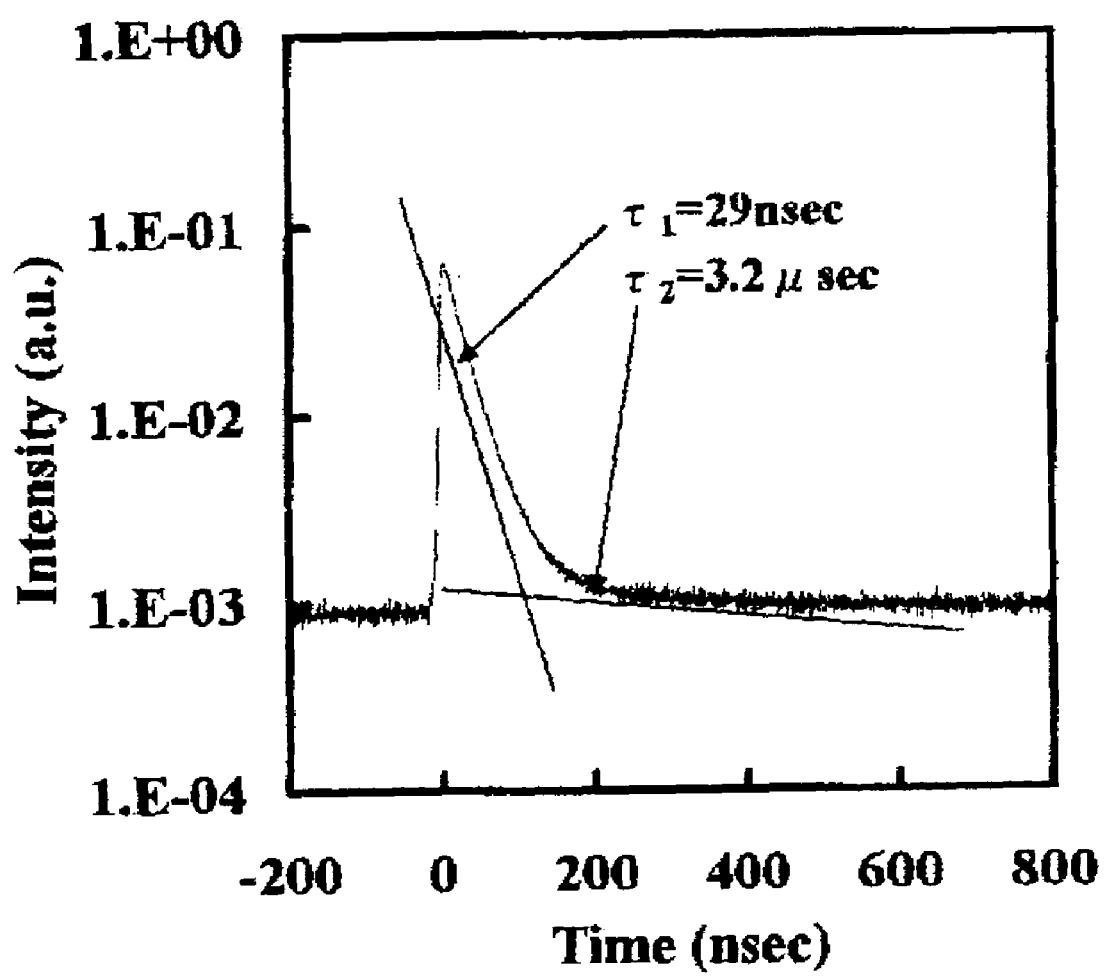
FIG. 3 is a graph showing luminescence decay measurements of a single crystals of Example 3.
Figure 4:
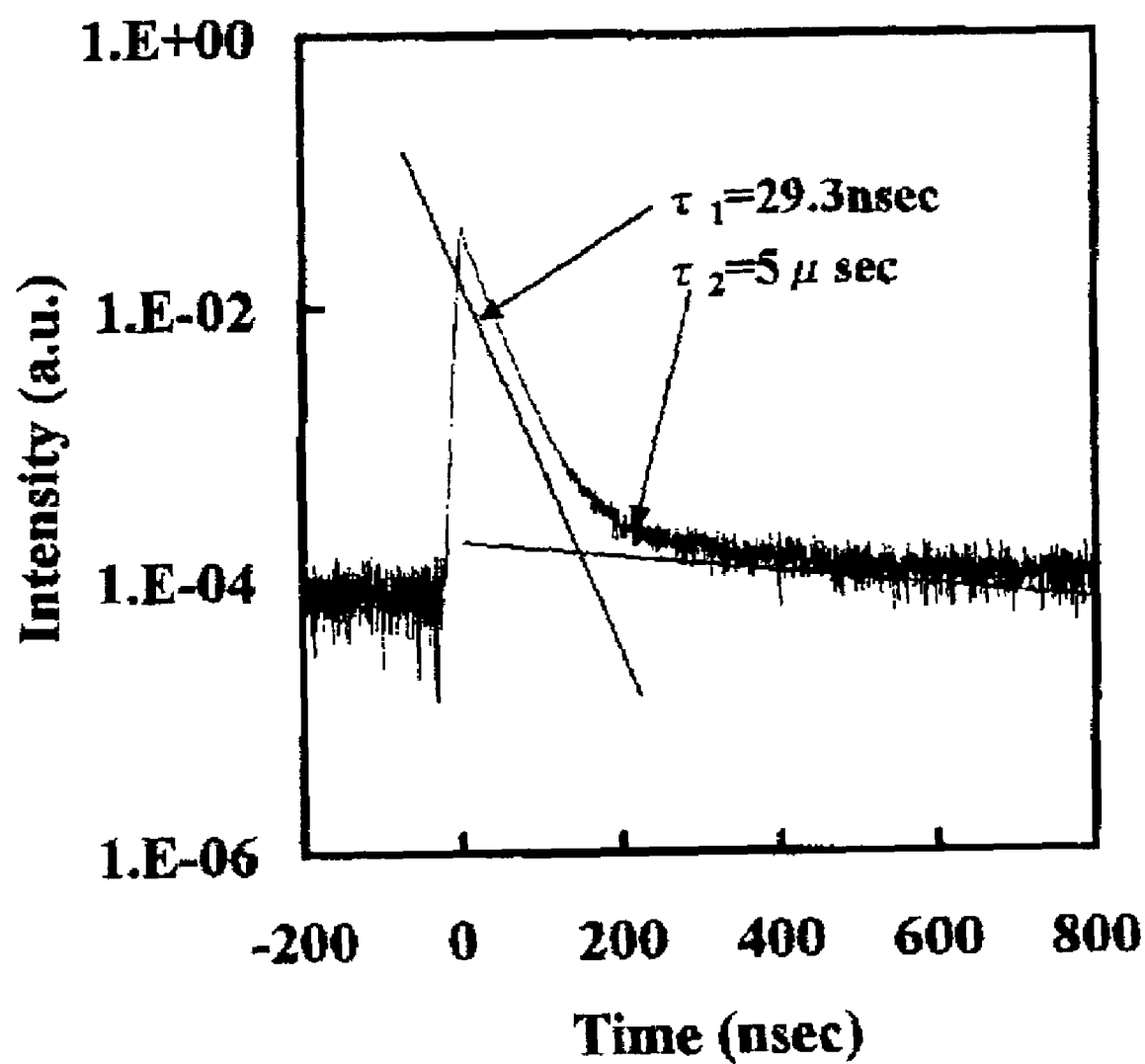
FIG. 4 is a graph showing luminescence decay measurements of a single crystals of Comparative Example 5.

3 and 4. As shown in FIGS. 3 and 4, decay time of luminescence induced by γ-ray were almost equivalent in Example 3 and Comparative Example 5. The results indicate that the fluoride single crystal of the invention provides remarkably enhanced γ-ray-induced emission output without lowering luminescence lifetime.

Test Example 5

Figure 5:
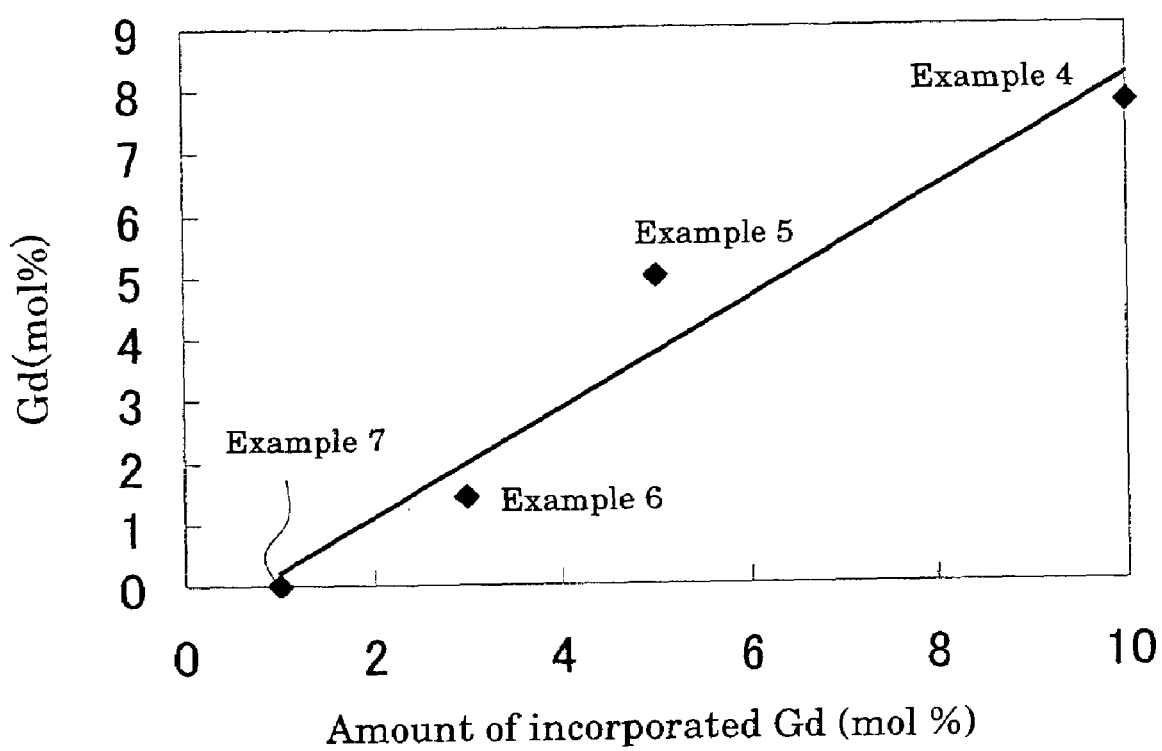
FIG. 5 is a graph showing Gd contents of single crystals of Examples 4 to 7 determined through EDS.

Gd content of each of the single crystals produced in Examples 4 to 7 was determined through EDS (energy dispersive spectroscopy). The results are shown in FIG. 5. The results indicate that each Gd content of the single crystal is lower than the value calculated from the amount of fed raw material.

As described hereinabove, the fluoride single crystal of the present invention for detecting radiation provides high-intensity luminescence, thereby attaining high resolution.

What is claimed is:

1. A fluoride single crystal for detecting radiation comprising Ce and, wherein the single crystal is represented by $Ce_{1-x}Lu_xF_3$ ($0.001 \leq x \leq 0.5$).

2. The fluoride single crystal for detecting radiation according to claim 1, which further contains at least one element ($R^2$) selected from among Sc, Y, and La and is represented by $(Ce_{1-x}Lu_x)_{1-y}R^2_yF_3$ ($0.001 \leq x \leq 0.5$; $y \leq 0.95$).

3. A radiation detector comprising a scintillator composed of a fluoride single crystal for detecting radiation as recited in claim 2, and a light detector detecting light emitted from the scintillator.

4. A method for detecting radiation comprising applying radiation to a fluoride single crystal as recited in claim 2, thereby emitting luminescence, and detecting the emitted luminescence.

5. A radiation detector comprising a scintillator composed of a fluoride single crystal for detecting radiation as recited in claim 1, and a light detector detecting light emitted from the scintillator.

6. A method for detecting radiation comprising applying radiation to a fluoride single crystal as recited in claim 1, thereby emitting luminescence, and detecting the emitted luminescence.

7. The fluoride single crystal for detecting radiation according to claim 1, which further contains Gd, wherein the single crystal is represented by $Ce_{1-x}R^1_xF_3$ ($0.001 \leq x \leq 0.5$, and $R^1$ represents Lu and Gd).

8. The fluoride single crystal for detecting radiation according to claim 7, which further contains at least one element ($R^2$) selected from among Sc, Y, and La and is represented by $(Ce_{1-x}R^1_x)_{1-y}R^2_yF_3$ ($0.001 \leq x \leq 0.5$; $y \leq 0.95$).

9. A radiation detector comprising a scintillator composed of a fluoride single crystal for detecting radiation as recited in claim 8, and a light detector detecting light emitted from the scintillator.

10. A method for detecting radiation comprising applying radiation to a fluoride single crystal as recited in claim 8, thereby emitting luminescence, and detecting the emitted luminescence.

11. A radiation detector comprising a scintillator composed of a fluoride single crystal for detecting radiation as recited in claim 7, and a light detector for detecting light emitted from the scintillator.

12. A method for detecting radiation comprising applying radiation to a fluoride single crystal as recited in claim 7, thereby emitting luminescence and detecting the emitted luminescence.

13. The scintillator composed of a fluoride single crystal comprising Ce and, wherein the single crystal is represented by $Ce_{1-x}Lu_xF_3$ ($0.001 \leq X \leq 0.5$).

14. The scintillator according to claim 3, wherein the fluoride single crystal further contains at least one element ($R^2$) selected from among Sc, Y, and La and is represented by $(Ce_{1-x}Lu_x)_{1-y}R^2_yF_3$ ($0.001 \leq x \leq 0.5$; $y \leq 0.95$).

15. The scintillator composed of a fluoride single crystal according to claim 13, which further contains Gd, wherein the single crystal is represented by $Ce_{1-x}R^1_xF_3$ ($0.001 \leq x \leq 0.5$, and $R^1$ represents Lu and Gd).

16. The scintillator according to claim 15, wherein the fluoride single crystal further contains at least one element ($R^2$) selected from among Sc, Y, and La and is represented by $(Ce_{1-x}R^1_x)_{1-y}R^2_yF_3$ ($0.001 \leq x \leq 0.5$; $y \leq 0.95$).

* * * * *